(12) United States Patent
Gu et al.

(10) Patent No.: US 12,443,441 B2
(45) Date of Patent: Oct. 14, 2025

(54) SCHEDULING METHOD, SCHEDULING APPARATUS AND STORAGE MEDIUM

(71) Applicant: BEIJING XIAOMI MOBILE SOFTWARE CO., LTD., Beijing (CN)

(72) Inventors: Chao Gu, Beijing (CN); Shuai He, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 588 days.

(21) Appl. No.: 17/877,844

(22) Filed: Jul. 29, 2022

(65) Prior Publication Data

US 2023/0297423 A1    Sep. 21, 2023

(30) Foreign Application Priority Data

Mar. 21, 2022  (CN) .......................... 202210278480.2

(51) Int. Cl.
   *G06F 9/48*  (2006.01)
(52) U.S. Cl.
   CPC .................. *G06F 9/4893* (2013.01)
(58) Field of Classification Search
   CPC ..................................................... G06F 9/4893
   See application file for complete search history.

(56) References Cited

U.S. PATENT DOCUMENTS

2008/0091974 A1   4/2008  Nakashima
2014/0344827 A1   11/2014 Mavila et al.
2020/0225985 A1   7/2020  Hayashidera
2020/0326994 A1*  10/2020 Ruiz .................... G06F 11/3058
2022/0354017 A1*  11/2022 Heydari ............. H05K 7/20509

FOREIGN PATENT DOCUMENTS

| CN | 106095046 | A | 11/2016 |
| CN | 106537285 | A | 3/2017 |
| CN | 107820306 | A | 3/2018 |
| CN | 113220094 | A | 8/2021 |
| EP | 2702461 | B1 | 6/2015 |

OTHER PUBLICATIONS

Extended European Search Report of EP Application No. 22191365.0 dated May 24, 2023, (8p).
First Office Action issued to Chinese Application No. 202210278480.2 dated Jul. 18, 2025 with English translation, (15p).

* cited by examiner

*Primary Examiner* — Charlie Sun (74) *Attorney, Agent, or Firm* — Arch & Lake LLP (57) ABSTRACT

The present disclosure relates to a scheduling method, a scheduling apparatus and a storage medium. The method includes: acquiring, by a terminal device, temperatures of the terminal device in two adjacent monitoring periods; determining a temperature change level based on a first temperature difference between the adjacent monitoring periods; and determining and executing a corresponding CPU scheduling strategy based on the temperature change level, to maintain the temperature of the terminal device below a temperature warning value.

13 Claims, 5 Drawing Sheets

SCHEDULING METHOD, SCHEDULING APPARATUS AND STORAGE MEDIUM

This application is based on and claims priority to the Chinese patent application with the application number of CN202210278480.2, filed on Mar. 21, 2022, the entire disclosure of which is incorporated herein by reference for all purposes.

TECHNICAL FIELD

The present disclosure relates to the field of terminals, and in particular, to a scheduling method, a scheduling apparatus and a storage medium.

BACKGROUND

With the development of technology, applications that can be supported by the terminal device are more and more abundant, and the demand for processing capabilities of hardware devices such as the central processing unit (CPU) of terminal device is also increasing. With the improvement of CPU production technology, the computing power (or hash rate) provided by the CPU of the terminal device is also getting stronger and stronger. With the support of high computing power, high-load applications such as games and cameras can also run smoothly.

SUMMARY

The present disclosure provides a scheduling method, a scheduling apparatus and a storage medium.

According to a first aspect of the present disclosure, there is provided a scheduling method, applied to a terminal device and including:
acquiring temperatures of the terminal device in two adjacent monitoring periods;
determining a temperature change level based on a first temperature difference between the adjacent monitoring periods; and
determining and executing a corresponding CPU scheduling strategy based on the temperature change level, to maintain the temperature of the terminal device below a temperature warning value.

According to a second aspect of the present disclosure, there is provided a scheduling apparatus, applied to a terminal device and including:
an acquisition module, configured to acquire temperatures of the terminal device in two adjacent monitoring periods;
a first determining module, configured to determine a temperature change level based on a first temperature difference between the adjacent monitoring periods; and
a second determining module, configured to determine and execute a corresponding CPU scheduling strategy based on the temperature change level, to maintain the temperature of the terminal device below a temperature warning value.

According to a third aspect of the present disclosure, there is provided a scheduling apparatus, including:
a processor; and
a memory, for storing instructions executable by the processor,
wherein, the processor is configured to execute any one of the scheduling methods described above.

According to a fourth aspect of embodiments of the present disclosure, there is provided a non-transitory computer-readable storage medium, wherein instructions in the storage medium, when executed by a processor of a scheduling apparatus, enables the scheduling apparatus to execute any one of the scheduling methods described above.

It is to be understood that the foregoing general description and the following detailed description are exemplary and explanatory only, which cannot limit the present disclosure.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description.

DETAILED DESCRIPTION

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In the related art, when the terminal device continuously runs high-load applications such as games and cameras, the CPU of the terminal device will continuously work at a high-performance working frequency. In such a high-load scenario, a large amount of heat will be generated inside the terminal device, and the generated heat cannot be dissipated in time, which will cause the temperature of the terminal device to become higher and higher, until it reaches the high temperature (thermal) warning value (usually 45° C.).

Figure 1:
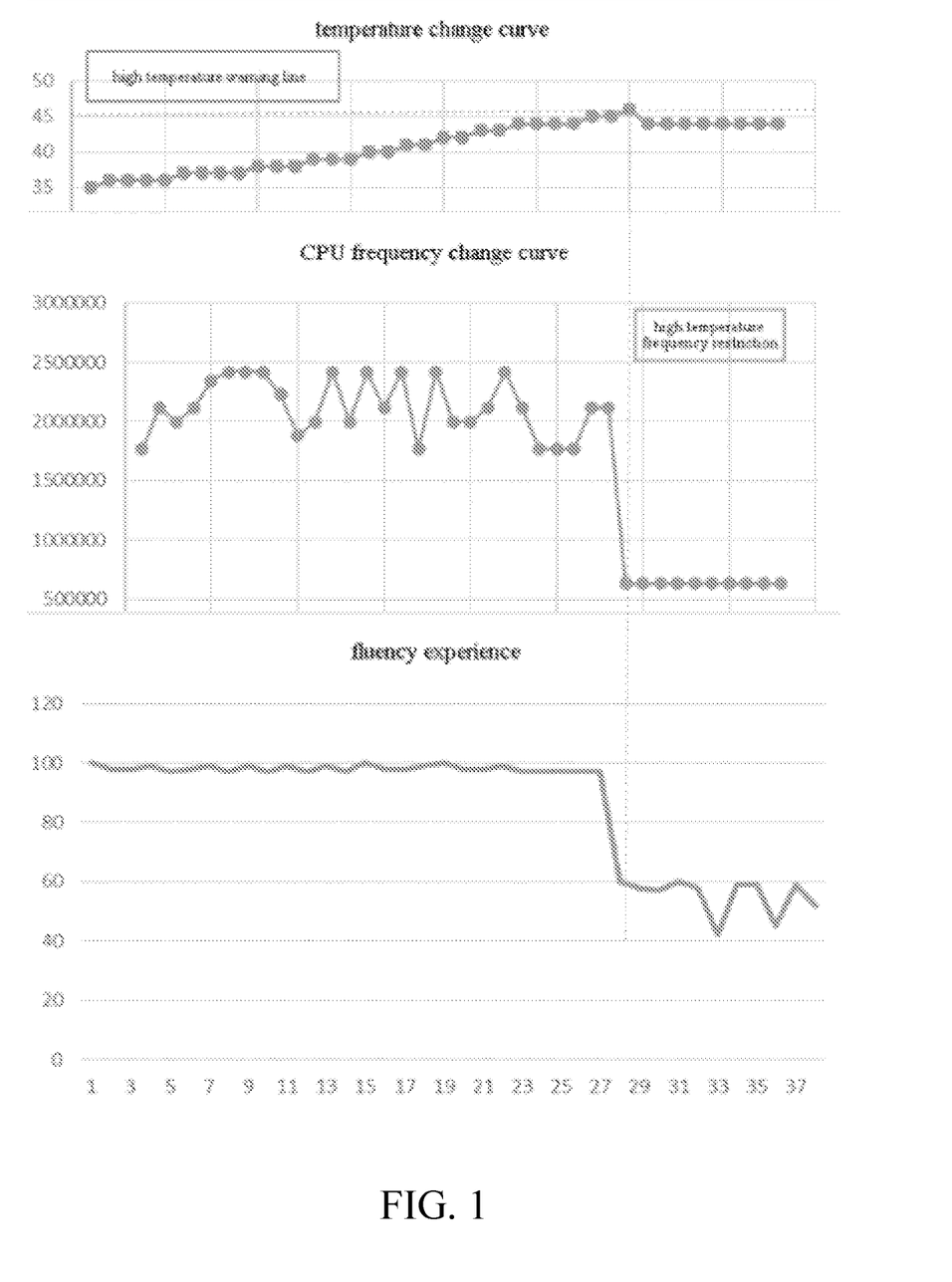
FIG. 1 is a schematic diagram of scheduling in the related art.

Combined with curves of various parameters that change with time in FIG. 1, in the solution of the related art, when the temperature of the terminal device reaches the high temperature warning value, the terminal device will take emergency cooling control measures to decrease sharply the frequency of the CPU to effectively alleviate the continued increase in temperature, to prevent the high temperature from scalding users or damaging internal devices. However, in this manner, the emergency frequency restriction of the CPU will cause the system to freeze and lose frames, which will lower the fluency experience and seriously affect the user experience.

In addition, as for a CPU with a multi-core architecture, an EAS (Energy Aware Scheduling) scheduler in the related art generally selects a scheduling strategy that prioritizes performance or power consumption. For example, as for the big-small core (Big.LITTLE) architecture of the CPU, in scenarios such as the application cold starting or resource loading, the primary scheduling principle is to improve performance, and task scheduling is implemented on the Big core to speed up tasks. Alternatively, in standby scenarios or music playback scenarios, the primary scheduling principle is to save power consumption, and small tasks are left in the LITTLE core. In this multi-core CPU scheduling manner, the influence of temperature is not considered, and the aforementioned problems after reaching the high temperature warning value will still occur.

An embodiment of the present disclosure proposes a scheduling method, which is applied to a terminal device. The method includes: acquiring temperatures of the terminal device in two adjacent monitoring periods; determining a temperature change level based on a first temperature difference between the adjacent monitoring periods; and determining and executing a corresponding CPU scheduling strategy based on the temperature change level, to maintain the temperature of the terminal device below a temperature warning value. In the method of the present disclosure, the temperature change of the terminal device can be monitored, and the CPU scheduling strategy can be dynamically adjusted in combination with the change trend of the temperature of the terminal device. The scheduling of the CPU is adjusted before the temperature reaches the warning value, thereby improving the problem of poor user experience caused by emergency control measures.

In an example embodiment, this embodiment proposes a scheduling method, which is applied to a terminal device. The terminal device may be an electronic device such as a mobile phone, a tablet computer, and a notebook computer. The terminal device in the embodiment of the present disclosure may include: a processor (CPU) platform based on a multi-core architecture, and an Energy Aware Scheduling (EAS) scheduler. The CPU with a multi-core architecture is conducive to a better balance between performance and power consumption.

In this embodiment, the multi-core architecture of the CPU may include: a Big. LITTLE architecture or a multi-core cluster architecture. In the Big.LITTLE architecture of the CPU, heavy-load tasks can be executed on the Big core for better performance experience, and light-load tasks can be executed on the LITTLE core to save power consumption. In the multi-core cluster architecture hatched by adding one or two super-large cores to provide additional performance support on the basis of the Big.LITTLE architecture, for example, the 3-cluster of the CPU, i.e., the Little-Mid-Big architecture, the Little cluster composed of small cores achieves power consumption saving under low load conditions; the Mid cluster composed of medium cores provides performance support; the Big cluster composed of large cores satisfies the interactive input with strict or sensitive response time requirements, and provide additional performance support when the system is under heavy load. The embodiments of the present disclosure are described by taking a 3-cluster architecture as an example.

Figure 2:
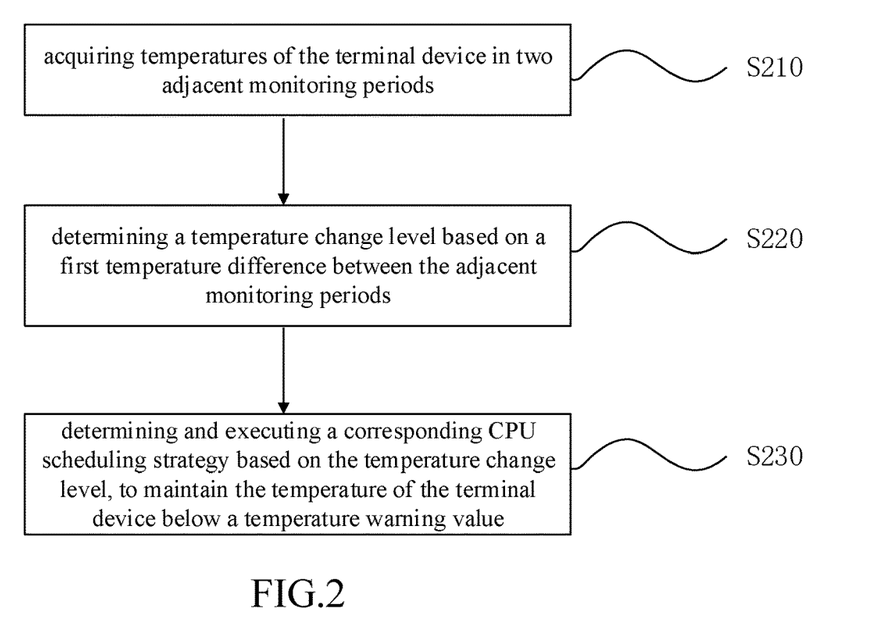
FIG. 2 is a flowchart of a method according to one or more examples of the present disclosure.

As shown in FIG. 2, the method of this embodiment may include following steps.

S210, temperatures of the terminal device in two adjacent monitoring periods are acquired.

S220, a temperature change level is determined based on a first temperature difference between the adjacent monitoring periods.

S230, a corresponding CPU scheduling strategy is determined and executed based on the temperature change level, to maintain the temperature of the terminal device below a temperature warning value.

In step S210, each preset duration in the running process of the terminal device may be divided into one monitoring period. For example, taking 5 minutes as a monitoring period, combined with the running time of the terminal device, a plurality of monitoring periods arranged in a chronological order is included. The temperature sensor inside the terminal device can detect the temperature in real time, and the EAS scheduler can acquire the temperature of each monitoring period. For example, the temperature at the initial moment or the end moment in each monitoring period is acquired, as the temperature of this monitoring period.

In this step, the EAS scheduler can continuously acquire the temperatures of two monitoring periods. Combined with the internal structure layout of the terminal device, a plurality of temperature sensors may be arranged inside the terminal device, and the plurality of temperature sensors may be located at different positions of the terminal device.

In each monitoring period, the terminal device can fit the acquired detection temperatures of the plurality of temperature sensors by combining the pre-configured fitting algorithm to acquire the average temperature, and the average temperature is used as the case temperature of the terminal device in this monitoring period. The accuracy of the temperature of the terminal device is improved.

In step S220, the difference between the temperatures of the two monitoring periods obtained in step S210 is recorded as the first temperature difference. The EAS scheduler can determine the temperature change level according to the value of the first temperature difference. The temperature change level can reflect the temperature change trend of adjacent monitoring periods.

In this step, for example, the first temperature difference is used to indicate a temperature difference between a current monitoring period and a previous monitoring period. In the execution process of this step, it may be firstly judged whether the first temperature difference is smaller than the change amount threshold. If not, step S221 is executed. If yes, step S222 is executed.

In an example, step S220 may include step S221, i.e., determining the temperature change level being a first level in response to that the first temperature difference is not smaller than a change amount threshold. In this example, the change amount threshold is set to, for example, 5° C. When the first temperature difference between the temperature acquired this time and the temperature acquired last time is greater than or equal to 5° C., the temperature change level is the first level. The first level indicates that the terminal device is in a rapid temperature rising state.

In another example, this step S220 may further include step S222, i.e., determining the temperature change level being a second level or a third level based on temperature changes of a plurality of consecutive monitoring periods, in response to that the first temperature difference is smaller than the change amount threshold. In this example, when the first temperature difference between the temperature obtained this time and the temperature obtained last time is smaller than 5° C., the temperature change level of the terminal device is not rapid temperature rising. It can be determined the specific temperature change level is the second level or the third level in combination with the temperatures of the plurality of monitoring periods. The second level indicates that the terminal device is in a continuous temperature rising state, and the third level indicates that the terminal device is in a non-continuous temperature rising state.

In step S230, the temperature warning value is set as, for example, the high temperature warning value 45° C. in FIG. 1. In this step, the corresponding relationship between the temperature change level and the CPU scheduling strategy may be pre-stored in the terminal device. The EAS scheduler searches the corresponding relationship for the scheduling strategy corresponding to the temperature change level, and performs scheduling on the CPU in combination with the scheduling strategy.

In the embodiment of the present disclosure, the temperature change of the terminal device is monitored in real time. Before the temperature of the terminal device reaches the temperature warning value, the CPU is dynamically scheduled in combination with the temperature change trend, so as to prevent the temperature of the terminal device from reaching the temperature warning value, thereby preventing the problem of poor user experience caused by the emergency control measures taken by the terminal device.

In an exemplary embodiment, the method of this embodiment includes steps S210 to S230 as shown in FIG. 2. Step S220 may include step S221 or step S222. In this embodiment, step S222 may include the following steps.

S222-1, a plurality of second temperature differences in the plurality of monitoring periods are successively determined based on temperatures of the plurality of consecutive monitoring periods including the current monitoring period.

S222-2, a corresponding temperature change level is determined based on the plurality of second temperature differences.

In step S222-1, the second temperature difference is used to indicate a temperature difference between a latter monitoring period and a former monitoring period in every two adjacent monitoring periods of the plurality of consecutive monitoring periods. In this step, when the temperature of the terminal device does not rise rapidly, the EAS scheduler may, after obtaining the first temperature difference, continue to obtain temperatures for a plurality of monitoring periods, and calculate and determine a plurality of second temperature differences. For example, after the first temperature difference is obtained, the temperatures of 3 to 5 consecutive monitoring periods are obtained, and the second temperature differences of adjacent periods are calculated respectively. It can be understood that, in this embodiment, the temperature difference is determined by subtracting the temperature of the former monitoring period from the temperature of the latter monitoring period.

In step S222-2, it is determined whether the temperature change level is continuous temperature rising or non-continuous temperature rising in combination with the temperature changes of several consecutive monitoring periods.

In an example, step S222-2 include step S222-21, i.e., determining the temperature change level being the second level in response to that the plurality of second temperature differences are all greater than 0 and increase successively. In this example, the plurality of second temperature differences are all greater than 0 and increase successively, it indicates that although the temperature of the terminal device does not rise rapidly, the temperatures of a plurality of continuous monitoring periods maintain an upward trend all the time. At this time, the temperature change level is the second level. That is, the terminal device is in a continuous temperature rising state.

In another example, step S222-2 includes step S222-22, i.e., determining the temperature change level being the third level in response to that a part of temperature differences among the plurality of second temperature differences is not greater than 0. In this example, the temperature change level that does not belong to the above-mentioned first level and second level can be regarded as being in the third level. When a part of the plurality of second temperature differences is not greater than 0, it indicates that the temperature does not rise all the time in the plurality of consecutive monitoring periods. At this time, the temperature change level is the third level. That is, the terminal device is in a non-continuous temperature rising state.

In embodiments of the present disclosure, in combination with the three temperature change levels in the foregoing embodiments, it can be known that from the first level, the second level to the third level, the temperature rising state of the terminal device gradually becomes better. Therefore, in combination with different temperature rising states of the terminal device under the three states, different levels of scheduling strategies can be implemented.

Figure 3:
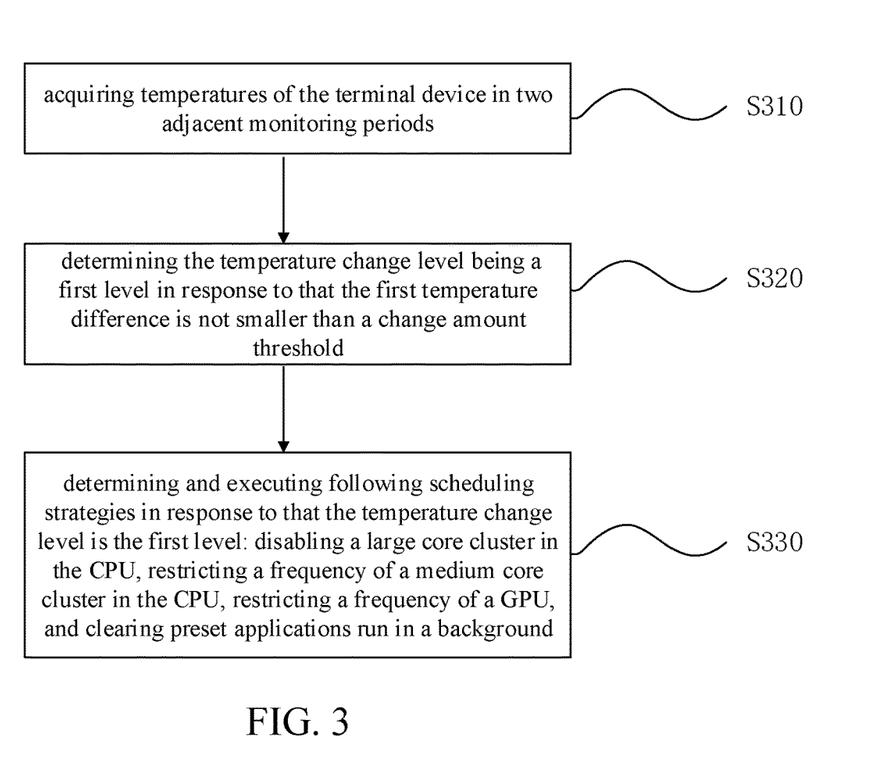
FIG. 3 is a flowchart of a method according to one or more examples of the present disclosure.

In an exemplary embodiment, as shown in FIG. 3, the method in this embodiment may include the following steps.

S310, temperatures of the terminal device in two adjacent monitoring periods are acquired.

S320, it is determined that the temperature change level is a first level in response to that the first temperature difference is not smaller than a change amount threshold.

S330, in response to that the temperature change level is the first level, following scheduling strategies are determined and executed: disabling a large core cluster in the CPU, restricting a frequency of a medium core cluster in the CPU, restricting a frequency of a GPU, and clearing preset applications run in a background.

For the implementation of steps S310 to S320, reference may be made to the implementations of steps S210 to S220 in the foregoing embodiments, and details are not described herein again.

In step S330, when the temperature change level of the terminal device is the first level, that is, when the terminal device is in a rapid temperature rising state, the EAS scheduler may adopt the most stringent scheduling strategy among the three levels. Combined with the aforementioned multi-core architecture of the CPU, in this step, the corresponding scheduling strategy will be implemented from the following aspects.

(1) A more conservative scheduling strategy for medium and large core clusters. For example, only applications related to user perception (such as the interface UI) are run on the medium and large core clusters.

(2) Restrict the high-frequency use of medium and large core clusters. For example, the frequency (i.e., operating frequency) of the medium core cluster in the CPU is restricted.

(3) A stricter background control strategy. For example, the CPU occupancy rate of background applications is frozen or reduced.

(4) Disable large core clusters. This measure may be a further strict scheduling measure based on measures (1) and (2), to avoid the largest power consumption overhead.

(5) Clear preset applications run in the background. For example, abnormal or power-consuming applications in the background are cleaned up. This measure can be a further strict scheduling measure on the basis of measure (3).

(6) Restrict the frequency of the GPU. For example, the high-frequency use of the graphics processing unit (GPU) is restricted.

In the embodiment of the present disclosure, the strictest scheduling strategy is implemented from a plurality of aspects, so as to prevent the terminal device from running heavy-load applications, and to minimize the main factors that cause the temperature rise of the terminal device, so as to maintain the temperature of the terminal device below the temperature warning value.

Figure 4:
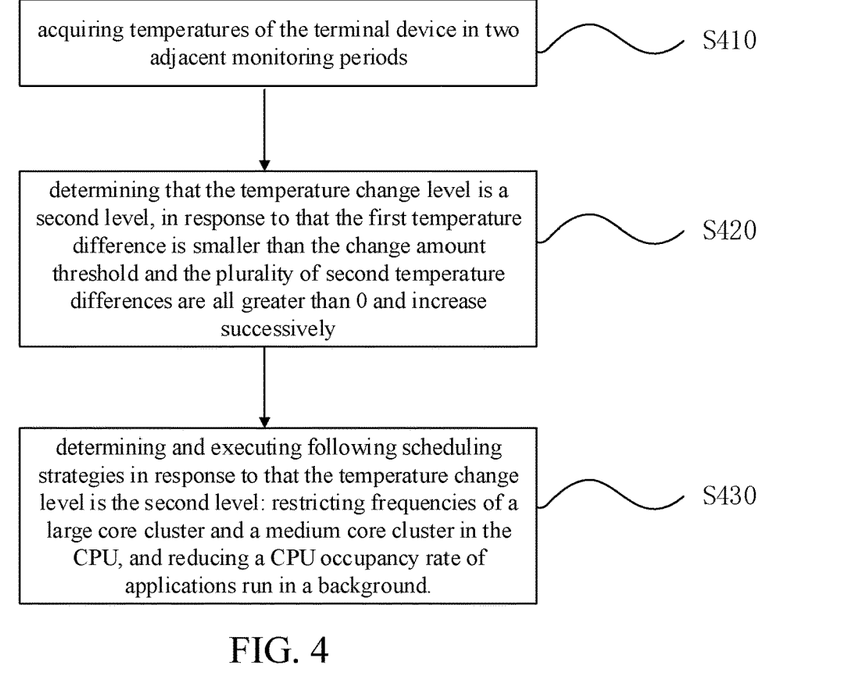
FIG. 4 is a flowchart of a method according to one or more examples of the present disclosure.

In an exemplary embodiment, as shown in FIG. 4, the method in this embodiment may include the following steps.

S410, temperatures of the terminal device in two adjacent monitoring periods are acquired.

S420, it is determined that the temperature change level is a second level, in response to that the first temperature difference is smaller than the change amount threshold and the plurality of second temperature differences are all greater than 0 and increase successively.

S430, in response to that the temperature change level is the second level, following scheduling strategies are determined and executed: restricting frequencies of a large core cluster and a medium core cluster in the CPU, and reducing a CPU occupancy rate of applications run in a background.

For the implementation of steps S410 to S420, reference may be made to the implementations of steps S210 to S220 in the foregoing embodiments, and details are not described herein again.

In step S430, when the temperature change level of the terminal device is the second level, that is, when the terminal device is in a continuous temperature rising state, the EAS scheduler may adopt a scheduling strategy that is less stringent than the first level and more stringent than the third level. Combined with the aforementioned multi-core architecture of the CPU, in this step, the corresponding scheduling strategy will be implemented from the following aspects.

(1) A more conservative scheduling strategy for medium and large core clusters. For example, only applications related to user perception (such as the interface UI) are run on the medium and large core clusters.

(2) Restrict the high-frequency use of medium and large core clusters, i.e., restrict the frequency of the large core cluster and medium core cluster. For example, the frequency (i.e. operating frequency) of the medium core cluster in the CPU is restricted.

(3) A stricter background control strategy. For example, the CPU occupancy rate of applications run in the background is frozen or reduced.

In the embodiment of the present disclosure, the frequency of the medium and large core clusters is mainly restricted, and the CPU occupancy rate of the background applications is restricted, so as to try to delay or change the continuous temperature rising of the terminal device, so as to maintain the temperature of the terminal device below the temperature warning value.

Figure 5:
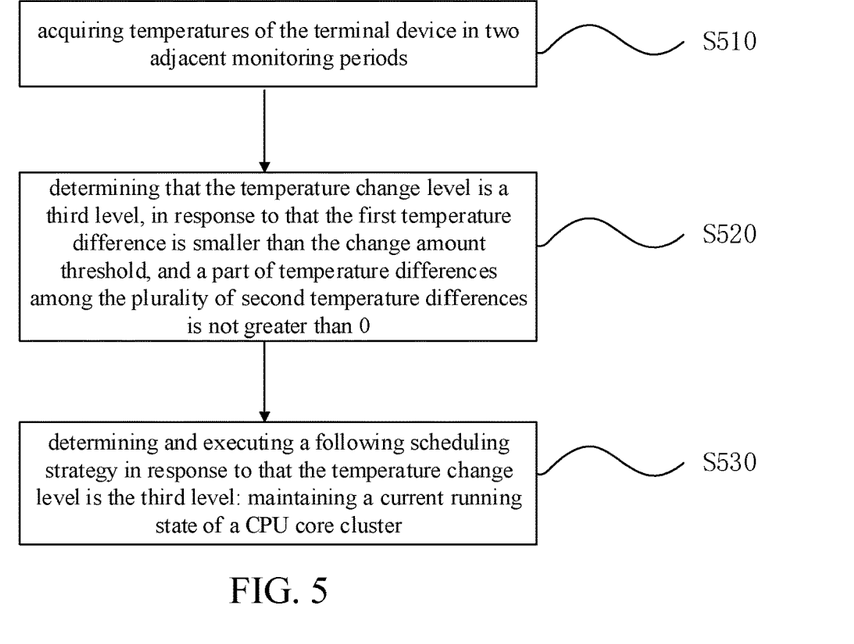
FIG. 5 is a flowchart of a method according to one or more examples of the present disclosure.

In an exemplary embodiment, as shown in FIG. 5, the method of this embodiment may include the following steps.

S510, temperatures of the terminal device in two adjacent monitoring periods are acquired.

S520, it is determined that the temperature change level is a third level, in response to that the first temperature difference is smaller than the change amount threshold, and a part of temperature differences among the plurality of second temperature differences is not greater than 0.

S530, in response to that the temperature change level is the third level, a following scheduling strategy is determined and executed: maintaining a current running state of a CPU core cluster.

For the implementation of steps S510 to S520, reference may be made to the implementation of steps S210 to S220 in the foregoing embodiments, and details are not described herein again.

In step S530, when the temperature change level of the terminal device is the third level, that is, when the terminal device is in a non-continuous temperature rising state, it indicates that the temperature rising state of the terminal device is in a normal state. The EAS scheduler may not take other adjustment measures, that is, maintaining the current running state of the CPU core cluster.

In the embodiment of the present disclosure, when the terminal device is in a non-continuous temperature rising state, the current operating state of the terminal device can be guaranteed, to balance the temperature rising and power consumption performance of the terminal device, and ensure smooth and continuity of the user experience.

Figure 6:
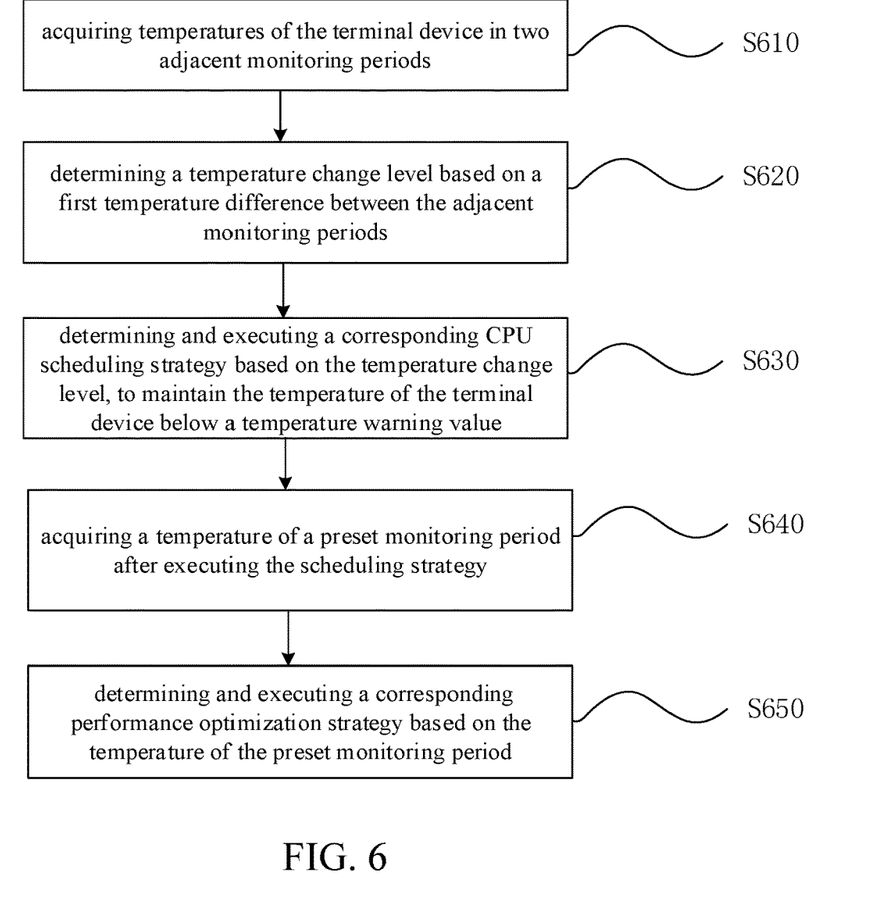
FIG. 6 is a flowchart of a method according to one or more examples of the present disclosure.

In an exemplary embodiment, as shown in FIG. 6, the method of this embodiment may include following steps.

S610, temperatures of the terminal device in two adjacent monitoring periods are acquired.

S620, a temperature change level is determined based on a first temperature difference between the adjacent monitoring periods.

S630, a corresponding CPU scheduling strategy is determined and executed based on the temperature change level, to maintain the temperature of the terminal device below a temperature warning value.

S640, a temperature of a preset monitoring period is acquired after executing the scheduling strategy.

S650, a corresponding performance optimization strategy is determined and executed based on the temperature of the preset monitoring period.

For the implementation of steps S610 to S630, reference may be made to the implementations of steps S210 to S230 in the foregoing embodiments, and details are not described herein again.

In step S640, the preset monitoring period may be, for example, the first monitoring period after executing the scheduling strategy. During the process of executing the scheduling strategy adapted to the temperature change level by the EAS scheduler, the temperature of the terminal device in each monitoring period can still be obtained, so as to learn the temperature change of the terminal device after executing the scheduling strategy in time.

In step S650, the EAS scheduler can learn whether the temperature rising state of the terminal device is adjusted after executing the scheduling strategy in combination with the temperature of the preset monitoring period, so that the EAS scheduler can adjust the running performance of the terminal device CPU in time after the temperature rising problem of the terminal device is adjusted.

In an example, this step S650 may include step S6501, i.e., determining and executing at least one of following performance optimization strategies in response to that the temperature of the preset monitoring period is smaller than a temperature threshold: stopping a measure of disabling or restricting a large core cluster and a medium core cluster in the CPU, stopping a measure of restricting a GPU, increasing frequencies of the large core cluster and the medium core cluster in the CPU.

In this example, the temperature threshold is smaller than the temperature warning value, for example, set as 38° C. When the temperature of the preset monitoring period is smaller than the temperature threshold, it indicates that the temperature of the terminal device is in the low temperature region, and all scheduling strategies under the first level or the second level can be canceled at this time. Combined with the aforementioned multi-core architecture of the CPU, in this example, when the temperature of the terminal device is in the low temperature region, the EAS scheduler will execute the corresponding performance optimization strategy from the following aspects.

(1) A more active scheduling strategy for medium and large core clusters. For example, it is resumed to process tasks according to the performance of each core cluster in the CPU multi-core cluster architecture. For example, the most heavily loaded task is executed by the large core cluster of the CPU.

(2) A rapid frequency increasing strategy under heavy loads. For example, automatic detection of frame loss can be enabled in this example. When the frame loss is serious, it indicates that the current task load is heavy, and it may be in a high-performance demand scenario. Therefore, real-time frequency increase can be performed at this time, such as increasing the frequency of the large core clusters and medium core cluster of the CPU, so as to ensure the running performance of the terminal device and improve the user experience.

(3) Release the frequency control restrictions on the medium core cluster and the large core cluster. For example, a measure of disabling or restricting the large core cluster and the medium core cluster in the CPU is stopped.

(4) Release the scheduling control of the application. For example, it will no longer clean up abnormal or power-consuming applications in the background.

(5) Release the restriction on the high-frequency use of the GPU. For example, a measure of restricting the GPU is stopped.

(6) Enable the large core. That is, the disabling measure for the large core cluster of the CPU is stopped, and the performance of processing the heavy-load task is exerted.

In another example, step S650 may include step S6502, i.e., determining and executing at least one of following performance optimization strategies in response to that the temperature of the preset monitoring period is not smaller than the temperature threshold and temperatures of a plurality of successive monitoring periods including the preset monitoring period gradually decrease: stopping a measure of disabling the large core cluster in the CPU, and restoring a frequency of the GPU.

In this example, when the temperature of the preset monitoring period is greater than or equal to 38° C., it indicates that the temperature of the terminal device is still in the high temperature region. If it is monitored that the temperature continues to drop for several consecutive monitoring periods, only some measures in all the scheduling strategies under the first level or the second level will be canceled in this example. Combined with the aforementioned multi-core architecture of the CPU, in this example, when the temperature of the terminal device is still in the high temperature region, but continues to drop, the EAS scheduler will implement the corresponding performance optimization strategy from the following aspects.

(4) Release the scheduling control of the application. For example, it will no longer clean up abnormal or power-consuming applications in the background.

(5) Release the restriction on the high-frequency use of the GPU. For example, a measure of restricting the GPU is stopped and the frequency of the GPU is restored.

(6) Enable the large core. That is, the disabling measure for the large core cluster of the CPU is stopped, and the performance of processing the heavy-load task is exerted.

In this example, the scheduling strategy control measures of other aspects can still be maintained.

Figure 7:
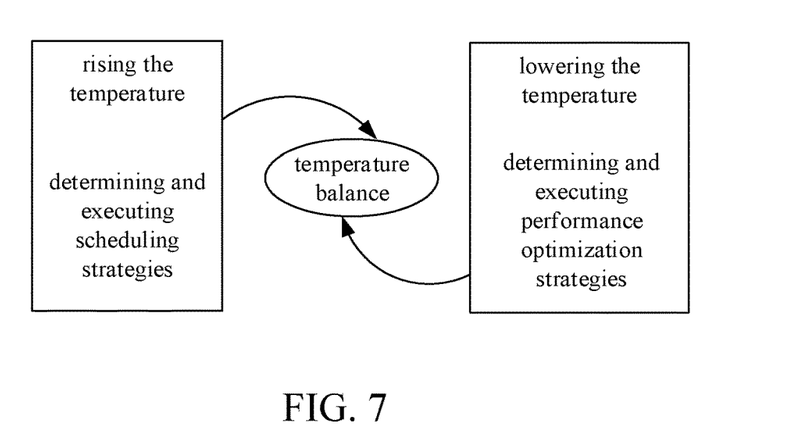
FIG. 7 is a schematic flowchart of a method according to one or more examples of the present disclosure.

In the embodiment of the present disclosure, in combination with FIG. 7, in the scheduling process, combined with the temperature change of the terminal device, it can not only adopt a corresponding scheduling strategy in time to restrict the temperature rise of the terminal equipment from being too high, but also adopt an active performance optimization strategy after the terminal device is cooled down by the scheduling strategy, to maintain the balance between the performance, power consumption and temperature rise of the terminal device, so as to ensure the user experience to the greatest extent and alleviate the problem of the terminal device becoming hot or freezing.

Figure 8:
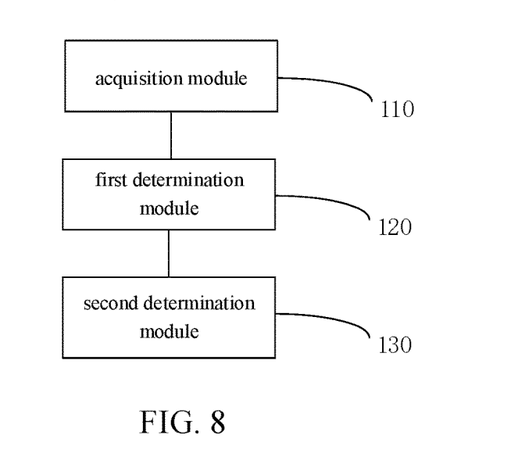
FIG. 8 is a block diagram of an apparatus according to one or more examples of the present disclosure.

In an exemplary embodiment, an embodiment of the present disclosure further provides a scheduling apparatus, applied to a terminal device. As shown in FIG. 8, the apparatus of this embodiment includes an acquisition module 110, a first determination module 120 and a second determination module 130. The apparatus of this embodiment is used to implement the method shown in any of the embodiments in FIG. 2 to FIG. 6. The acquisition module 110 is configured to acquire temperatures of the terminal device in two adjacent monitoring periods. The first determining module 120 is configured to determine a temperature change level based on a first temperature difference between the adjacent monitoring periods. The second determining module 130 is configured to determine and execute a corresponding CPU scheduling strategy based on the temperature change level, to maintain the temperature of the terminal device below a temperature warning value.

In an exemplary embodiment, still as shown in FIG. 8, the first temperature difference is used to indicate a temperature difference between a current monitoring period and a previous monitoring period; the first determining module 120 is configured to: determine the temperature change level being a first level in response to that the first temperature difference is not smaller than a change amount threshold; determine the temperature change level being a second level or a third level based on temperature changes of a plurality of consecutive monitoring periods, in response to that the first temperature difference is smaller than the change amount threshold.

In the present embodiment, the first determining module 120 is further configured to: successively determine a plurality of second temperature differences in the plurality of monitoring periods based on temperatures of the plurality of consecutive monitoring periods including the current monitoring period, wherein the second temperature difference is used to indicate a temperature difference between a latter monitoring period and a former monitoring period in every two adjacent monitoring periods of the plurality of consecutive monitoring periods; determine a corresponding temperature change level based on the plurality of second temperature differences.

In an exemplary embodiment, still as shown in FIG. 8, the first determining module 120 is further configured to: determine the temperature change level being the second level in response to that the plurality of second temperature differences are all greater than 0 and increase successively; determine the temperature change level being the third level in response to that a part of temperature differences among the plurality of second temperature differences is not greater than 0.

In an exemplary embodiment, still as shown in FIG. 8, the second determining module 130 is configured to: determine and execute following scheduling strategies in response to that the temperature change level is the first level: disabling a large core cluster in the CPU, restricting a frequency of a medium core cluster in the CPU, restricting a frequency of a GPU, and clearing preset applications run in a background.

In an exemplary embodiment, still as shown in FIG. 8, the second determining module 130 is further configured to: determine and execute following scheduling strategies in response to that the temperature change level is the second level: restricting frequencies of a large core cluster and a medium core cluster in the CPU, and reducing a CPU occupancy rate of applications run in a background; or, determine and execute a following scheduling strategy in response to that the temperature change level is the third level: maintaining a current running state of a CPU core cluster.

In an exemplary embodiment, still as shown in FIG. 8, the acquisition module 110 is further configured to acquire a temperature of a preset monitoring period after executing the scheduling strategy. The second determining module 130 is further configured to determine and execute a corresponding performance optimization strategy based on the temperature of the preset monitoring period.

In the present embodiment, the second determining module 130 is configured to: determine and execute at least one of following performance optimization strategies in response to that the temperature of the preset monitoring period is smaller than a temperature threshold: stopping a measure of disabling or restricting a large core cluster and a medium core cluster in the CPU, stopping a measure of restricting a GPU, increasing frequencies of the large core cluster and the medium core cluster in the CPU; determine and execute at least one of following performance optimization strategies in response to that the temperature of the preset monitoring period is not smaller than the temperature threshold and temperatures of a plurality of successive monitoring periods including the preset monitoring period gradually decrease: stopping a measure of disabling the large core cluster in the CPU, and restoring a frequency of the GPU, wherein, the temperature threshold is smaller than the temperature warning value.

Figure 9:
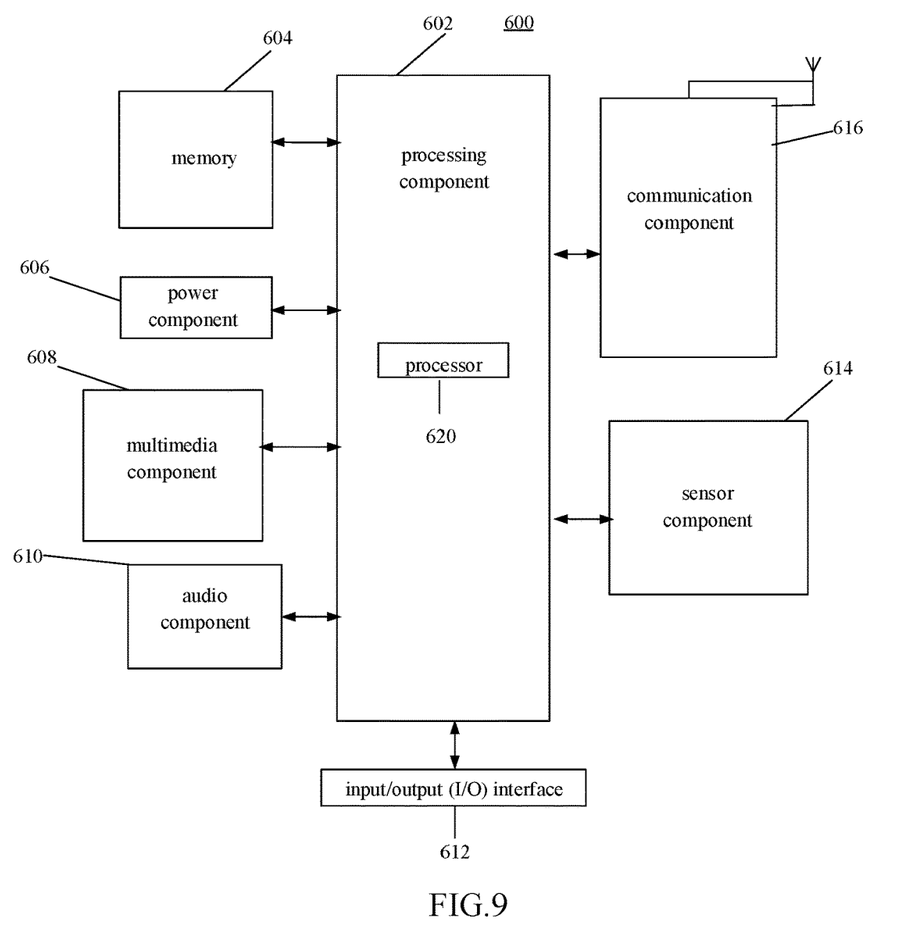
FIG. 9 is a block diagram of a scheduling apparatus according to one or more examples of the present disclosure.

FIG. 9 is a block diagram of a scheduling apparatus. For example, the scheduling apparatus may be an EAS scheduler or a terminal device. When the scheduling apparatus is a terminal device, for example, the device 600 may be a mobile phone, computer, digital broadcasting terminal, messaging device, game console, tablet device, medical device, fitness device, personal digital assistant, etc.

The device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the device 600, such as the operations associated with display, telephone calls, data communications, camera operations, and recording operations. The processing component 602 can include one or more processors 620 to execute instructions to perform all or part of the steps in the above described methods. Moreover, the processing component 602 can include one or more modules to facilitate the interaction between the processing component 602 and other components. For example, the processing component 602 can include a multimedia module to facilitate the interaction between the multimedia component 608 and the processing component 602.

The memory 604 is configured to store various types of data to support the operation of the device 600. Examples of such data include instructions for any application or method operated on the device 600, such as the contact data, the phone book data, messages, pictures, videos, and the like. The memory 604 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 can include a power management system, one or more power sources, and other components associated with the generation, management, and distribution of power in the device 600.

The multimedia component 608 includes a screen providing an output interface between the device 600 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. When the device 600 is in an operation mode, such as a photographing mode or a video mode, the front camera and/or the rear camera can receive external multimedia datum. Each of the front camera and the rear camera may be a fixed optical lens system or have focus and optical zoom capability.

The audio component 610 is configured to output and/or input an audio signal. For example, the audio component 610 includes a microphone (MIC) configured to receive an external audio signal when the device 600 is in an operation mode, such as a call mode, a recording mode, and a voice recognition mode. The received audio signal may be further stored in the memory 604 or sent via the communication component 616. In some embodiments, the audio component 610 also includes a speaker for outputting the audio signal.

The I/O interface 612 provides an interface between the processing component 602 and peripheral interface modules, such as a keyboard, a click wheel, buttons, and the like. These buttons may include, but are not limited to, a home button, a volume button, a starting button, and a locking button.

The sensor component 614 includes one or more sensors for providing status assessments of various aspects of the device 600. For example, the sensor component 614 can detect an open/closed status of the device 600, relative positioning of components, such as the display and the keypad of the device 600. The sensor component 614 can also detect a change in position of the detection device 600 or one component of the device 600, the presence or absence of user contact with the device 600, an orientation, or an acceleration/deceleration of the device 600, and a change in temperature of the device 600. The sensor component 614 can also include a proximity sensor configured to detect the presence of nearby objects without any physical contact. The sensor component 614 can also include a light sensor, such as a CMOS or CCD image sensor, configured to use in imaging applications. In some embodiments, the sensor component 614 can also include an accelerometer sensor, a gyroscope sensor, a magnetic sensor, a pressure sensor, or a temperature sensor.

The communication component 616 is configured to facilitate wired or wireless communication between the device 600 and other devices. The device 600 can access a wireless network based on a communication standard, such as Wi-Fi, 2G or 3G, or a combination thereof. In an exemplary embodiment, the communication component 616 receives broadcast signals or broadcast associated information from an external broadcast management system via a broadcast channel. In an exemplary embodiment, the communication component 616 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 600 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the method described above.

In an exemplary embodiment, there is also provided a non-transitory computer-readable storage medium including instructions, such as a memory 604 including instructions executable by the processor 620 of the device 600 to perform the methods described method. For example, the non-transitory computer readable storage medium may be a ROM, a random access memory (RAM), a CD-ROM, a magnetic tape, a floppy disc, and an optical data storage device, or the like. When the instructions in the storage medium are executed by the processor of the terminal device, the terminal device is enabled to execute the above methods.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A scheduling method, performed by a terminal device having a multi-core CPU architecture, a temperature sensor, an Energy Aware Scheduling (EAS) scheduler, and a graphics processing unit (GPU), comprising:
    acquiring, by the temperature sensor, temperatures of the terminal device in two adjacent monitoring periods;
    determining, by the EAS scheduler, a temperature change level based on a first temperature difference between the adjacent monitoring periods, wherein the temperature change level comprises a first level, a second level, and a third level; and
    adjusting dynamically, by the EAS scheduler, a corresponding CPU scheduling strategy based on the temperature change level, to maintain a temperature of the terminal device below a temperature warning value, wherein the CPU scheduling strategy comprises at least one of following:
    disabling a large core cluster in the CPU, restricting a frequency of a medium core cluster in the CPU, restricting a frequency of the GPU, and clearing preset applications run in a background, in response to that the temperature change level is the first level;
    restricting frequencies of a large core cluster and a medium core cluster in the CPU, and reducing a CPU occupancy rate of applications run in a background, in response to that the temperature change level is the second level; or maintaining a current running state of a CPU core cluster, in response to that the temperature change level is the third level.

2. The scheduling method according to claim 1, wherein the first temperature difference is configured to indicate a temperature difference between a current monitoring period and a previous monitoring period; and wherein determining the temperature change level based on the first temperature difference between the adjacent monitoring periods comprises:

determining the temperature change level being the first level in response to that the first temperature difference is not smaller than a change amount threshold; and determining the temperature change level being the second level or the third level based on temperature changes of a plurality of consecutive monitoring periods, in response to that the first temperature difference is smaller than the change amount threshold.

3. The scheduling method according to claim 2, wherein determining the temperature change level being the second level or the third level based on temperature changes of a plurality of consecutive monitoring periods comprises:

successively determining a plurality of second temperature differences in the plurality of monitoring periods based on temperatures of the plurality of consecutive monitoring periods comprising the current monitoring period, wherein the second temperature difference is configured to indicate a temperature difference between a latter monitoring period and a former monitoring period in every two adjacent monitoring periods of the plurality of consecutive monitoring periods; and determining a corresponding temperature change level based on the plurality of second temperature differences.

4. The scheduling method according to claim 3, wherein determining the corresponding temperature change level based on the plurality of second temperature differences comprises:

determining the temperature change level being the second level in response to that the plurality of second temperature differences are all greater than 0 and increase successively; and determining the temperature change level being the third level in response to that a part of temperature differences among the plurality of second temperature differences is not greater than 0.

5. The scheduling method according to claim 1, further comprising:

acquiring a temperature of a preset monitoring period after executing the scheduling strategy; and determining and executing a corresponding performance optimization strategy based on the temperature of the preset monitoring period.

6. The scheduling method according to claim 5, wherein determining and executing the corresponding performance optimization strategy based on the temperature of the preset monitoring period comprises:

determining and executing at least one of following performance optimization strategies in response to that the temperature of the preset monitoring period is smaller than a temperature threshold: stopping a measure of disabling or restricting a large core cluster and a medium core cluster in the CPU, stopping a measure of restricting a GPU, or increasing frequencies of the large core cluster and the medium core cluster in the CPU; and determining and executing at least one of following performance optimization strategies in response to that the temperature of the preset monitoring period is not smaller than the temperature threshold and temperatures of a plurality of successive monitoring periods comprising the preset monitoring period gradually decrease: stopping a measure of disabling the large core cluster in the CPU, or restoring a frequency of the GPU, wherein, the temperature threshold is smaller than the temperature warning value.

7. A scheduling apparatus, applied to a terminal device having a multi-core CPU architecture, a temperature sensor, an Energy Aware Scheduling (EAS) scheduler, and a graphics processing unit (GPU), and comprising:

a processor; and a memory, for storing instructions executable by the processor, wherein the processor is configured to:

acquire temperatures of the terminal device in two adjacent monitoring periods;

determine a temperature change level based on a first temperature difference between the adjacent monitoring periods, wherein the temperature change level comprises a first level, a second level, and a third level; and adjust dynamically a corresponding CPU scheduling strategy based on the temperature change level, to maintain a temperature of the terminal device below a temperature warning value, wherein the CPU scheduling strategy comprises at least one of following:

disabling a large core cluster in the CPU, restricting a frequency of a medium core cluster in the CPU, restricting a frequency of the GPU, and clearing preset applications run in a background, in response to that the temperature change level is the first level;

restricting frequencies of a large core cluster and a medium core cluster in the CPU, and reducing a CPU occupancy rate of applications run in a background, in response to that the temperature change level is the second level; or maintaining a current running state of a CPU core cluster, in response to that the temperature change level is the third level.

8. The scheduling apparatus according to claim 7, wherein the first temperature difference is configured to indicate a temperature difference between a current monitoring period and a previous monitoring period; and the processor is further configured to:

determine the temperature change level being the first level in response to that the first temperature difference is not smaller than a change amount threshold; and determine the temperature change level being the second level or the third level based on temperature changes of a plurality of consecutive monitoring periods, in response to that the first temperature difference is smaller than the change amount threshold.

9. The scheduling apparatus according to claim 8, wherein the processor is further configured to:

successively determine a plurality of second temperature differences in the plurality of monitoring periods based on temperatures of the plurality of consecutive monitoring periods comprising the current monitoring period, wherein the second temperature difference is configured to indicate a temperature difference between a latter monitoring period and a former monitoring period in every two adjacent monitoring periods of the plurality of consecutive monitoring periods; and determine a corresponding temperature change level based on the plurality of second temperature differences.

10. The scheduling apparatus according to claim 9, wherein the processor is further configured to:

determine the temperature change level being the second level in response to that the plurality of second temperature differences are all greater than 0 and increase successively; and determine the temperature change level being the third level in response to that a part of temperature differences among the plurality of second temperature differences is not greater than 0.

11. The scheduling apparatus according to claim 7, wherein the processor is further configured to acquire a temperature of a preset monitoring period after executing the scheduling strategy; and the processor is further configured to determine and execute a corresponding performance optimization strategy based on the temperature of the preset monitoring period.

12. The scheduling apparatus according to claim 11, wherein the processor is further configured to:

determine and execute at least one of following performance optimization strategies in response to that the temperature of the preset monitoring period is smaller than a temperature threshold: stopping a measure of disabling or restricting a large core cluster and a medium core cluster in the CPU, stopping a measure of restricting a GPU, or increasing frequencies of the large core cluster and the medium core cluster in the CPU; and determine and execute at least one of following performance optimization strategies in response to that the temperature of the preset monitoring period is not smaller than the temperature threshold and temperatures of a plurality of successive monitoring periods comprising the preset monitoring period gradually decrease: stopping a measure of disabling the large core cluster in the CPU, or restoring a frequency of the GPU, wherein, the temperature threshold is smaller than the temperature warning value.

13. A non-transitory computer-readable storage medium, wherein instructions in the storage medium, when executed by a processor of a scheduling apparatus, enables the scheduling apparatus to execute a scheduling method, the method comprising:

acquiring, by a temperature sensor of a terminal device, temperatures of the terminal device in two adjacent monitoring periods;

determining, by an Energy Aware Scheduling (EAS) scheduler of the terminal device, a temperature change level based on a first temperature difference between the adjacent monitoring periods, wherein the temperature change level comprises a first level, a second level, and a third level; and adjusting dynamically, by the EAS scheduler, a corresponding CPU scheduling strategy based on the temperature change level, to maintain the temperature of the terminal device below a temperature warning value, wherein the CPU scheduling strategy comprises at least one of following:

disabling a large core cluster in the CPU, restricting a frequency of a medium core cluster in the CPU, restricting a frequency of a graphics processing unit (GPU), and clearing preset applications run in a background, in response to that the temperature change level is the first level;

restricting frequencies of a large core cluster and a medium core cluster in the CPU, and reducing a CPU occupancy rate of applications run in a background, in response to that the temperature change level is the second level; or maintaining a current running state of a CPU core cluster, in response to that the temperature change level is the third level.

* * * * *